United States Patent
Bordawekar et al.

(10) Patent No.: US 10,394,803 B2
(45) Date of Patent: Aug. 27, 2019

(54) METHOD AND SYSTEM FOR SEMANTIC-BASED QUERIES USING WORD VECTOR REPRESENTATION

(71) Applicant: International Business Machines Corporation, Armonk, NY (US)

(72) Inventors: Rajesh R. Bordawekar, Yorktown Heights, NY (US); Oded Shmueli, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 957 days.

(21) Appl. No.: 14/940,716

(22) Filed: Nov. 13, 2015

(65) Prior Publication Data

US 2017/0139984 A1 May 18, 2017

(51) Int. Cl.
| | | |
|---|---|---|
| G06F 15/18 | (2006.01) | |
| G06F 16/242 | (2019.01) | |
| G06F 17/27 | (2006.01) | |
| G06N 20/00 | (2019.01) | |

(52) U.S. Cl.
CPC .......... G06F 16/243 (2019.01); G06F 17/277 (2013.01); G06N 20/00 (2019.01)

(58) Field of Classification Search
CPC .................. G06F 17/3087; G06N 5/003
USPC ...................................................... 706/15, 45
See application file for complete search history.

(56) References Cited

U.S. PATENT DOCUMENTS

| | | | | |
|---|---|---|---|---|
| 6,169,990 | B1* | 1/2001 | McGregor | ........ G06F 17/30952 |
| 6,470,306 | B1* | 10/2002 | Pringle | ................. G06F 17/241 |
| | | | | 704/3 |
| 2005/0027717 | A1* | 2/2005 | Koudas | ............. G06F 17/30536 |
| 2009/0164427 | A1* | 6/2009 | Shields | ............. G06F 17/30613 |
| 2010/0312769 | A1* | 12/2010 | Bailey | ............... G06F 17/30705 |
| | | | | 707/740 |
| 2011/0125578 | A1 | 5/2011 | Alspector et al. | |
| 2015/0052084 | A1 | 2/2015 | Kolluru et al. | |

OTHER PUBLICATIONS

Dreher et al ("Assisted query formulation using normalised word vector and dynamic ontological filtering", vol. 4027 LNAI, 2006, pp. 282-294, 7th International Conference on Flexible Query Answering Systems, FQAS 2006; Milan; Italy; Jun. 7, 2006 through Jul. 10, 2006; Code 67889).

S. Arora et al.; "Random walks on context spaces: Towards an explanation of the mysteries of semantic word embeddings"; CoRR, abs/1502.03520; 2015; whole document (23 pages).

(Continued)

*Primary Examiner* — David R Vincent
(74) *Attorney, Agent, or Firm* — Harrington & Smith (57) ABSTRACT

A method, apparatus, and computer program product are provided for generating a set of token sequences for at least a portion of a database, wherein each token in a sequence represents a respective database entity of the database; assigning, for each token in the set of token sequences, at least one corresponding vector from a set of vectors of a same dimension, wherein the at least one corresponding vector encodes relationships between the database entity of a token and other database entities of other tokens of the set of token sequences; and extracting, using a query language, information from the database based at least in part on the relationships encoded by the assigned vectors.

19 Claims, 8 Drawing Sheets

(56) References Cited

OTHER PUBLICATIONS

Y. Bengio et al.; "A neural probabilistic language model"; Journal of Machine Learning Research, 3; 2003; pp. 1137-1155.
O. Levy et al.; "Linguistic regularities in sparse and explicit word representations"; In Proceedings of the Eighteenth Conference on Computational Natural Language Learning, CoNLL, Baltimore, Maryland, USA; Jun. 26-27, 2014; pp. 171-180.
O. Levy et al.; "Neural word embedding as implicit matrix factorization"; In Advances in Neural Information Processing Systems 27: Annual Conference on Neural Information Processing Systems, Montreal, Quebec, Canada; Dec. 8-13, 2014; pp. 2177-2185.
T. Mikolov; "word2vec: Tool for computing continuous distributed representations of words"; https://code.google.com/p/word2vec; 2015; whole document (4 pages).
T. Mikolov et al.; "Efficient estimation of word representations in vector space"; CoRR, abs/1301.3781; 2013; whole document (12 pages).
T. Mikolov et al.; "Exploiting similarities among languages for machine translation"; CoRR, abs/1309.4168; 2013; whole document (10 pages).
T. Mikolov et al.; "Distributed representations of words and phrases and their compositionality"; In Advances in Neural Information Processing Systems 26: 27th Annual Conference on Neural Information Processing Systems 2013; Proceedings of a meeting held Dec. 5-8, 2013, Lake Tahoe, Nevada, United States; pp. 3111-3119.
A. Mnih et al.; "Learning word embeddings efficiently with noise-contrastive estimation"; In Advances in Neural Information Processing Systems 26: 27th Annual Conference on Neural Information Processing Systems 2013; Proceedings of a meeting held Dec. 5-8, 2013, Lake Tahoe, Nevada, United States; pp. 2265-2273.
J. Pennington et al.; "Glove: Global vectors for word representation"; In Proceedings of the 2014 Conference on Empirical Methods in Natural Language Processing, EMNLP 2014, Oct. 25-29, 2014, Doha, Qatar; A meeting of SIGDAT, a Special Interest Group of the ACL; pp. 1532-1543.

\* cited by examiner

| empNum | firstName | lastName | salary | dept | jobDesc | eval |
|---|---|---|---|---|---|---|
| 119 | John | Smith | 95 | Multimedia | manager multimedia entertainment | good people skills not punctual need improvement |
| 129 | Judy | White | 67 | Sports | employee golf section | diligent always on time |
| 122 | Joe | Brown | 77 | Toy | employee puzzles and electronic games | technical wiz very pleasant |
| 406 | Alice | Morgan | 60 | Cosmetics | high end fragrances | takes a bit long to make a sale |
| 023 | Janice | Brown | 50 | Toy | entry level puzzles and electronic games | need improve friendliness | emp Relation

119 John Smith 95 Multimedia manager multimedia entertainment good people skills not punctual need improvement 129 Judy White 67 Sports employee golf section diligent always on time 122 Joe Brown 77 Toy employee puzzles and electronic games technical wiz very pleasant 406 Alice Morgan 60 Cosmetics high end fragrances takes a bit long to make a sale 023 Janice Brown 50 Toy entry level puzzles and electronic games need improve friendliness

FIG. 4B emp Relation 400

| empNum | firstName | lastName | salary | dept | jobDesc | eval |
|---|---|---|---|---|---|---|
| 119 | John | Smith | 95 | Multimedia | manager multimedia entertainment | good people skills not punctual need improvement |
| 129 | Judy | White | 67 | Sports | employee golf section | diligent always on time |
| 122 | Joe | Brown | 77 | Toy | employee puzzles and electronic games | technical wiz Very pleasant |
| 406 | Alice | Morgan | 60 | Cosmetics | high end fragrances | takes a bit long to make a sale |
| 023 | Janice | Brown | 50 | Toy | entry level puzzles and electronic games | need improve friendliness | emp_Num 119 firstName John lastName Smith salary 95 dept Multimedia jobDesc manager multimedia entertainment eval good people skills not punctual need improvement empNum 129 firstName Judy lastName White salary 67 dept Sports jobDesc employee golf section eval diligent always on time empNum 122 firstName Joe lastName Brown salary 77 dept Toy jobDesc employee puzzles and electronic games eval technical wiz very pleasant empNum 406 firstName Alice lastName Morgan salary 60 dept Cosmetics jobDEsc high end fragrances eval takes a bit long to make a sale empNum 023 firstName Janice lastName Brown salary 50 dept Toy jobDesc entry level puzzles and electronic games eval need improve friendliness

600 address Relation

| id  | stNum | street        | city       | state | zip   | remarks                              |
|-----|-------|---------------|------------|-------|-------|--------------------------------------|
| 119 | 100   | 10th          | Newark     | NJ    | 07105 | alternate 19 Chatsworth Ave Larchmont NY |
| 129 | 121   | 113th         | NY         | NY    | 10025 | none                                 |
| 122 | 806   | Columbus Ave  | NY         | NY    | 10026 | none                                 |
| 406 | 1000  | Hutchinson Ave| Larchmont  | NY    | 10538 | alternate 22 10th Newark NJ          |
| 023 | 9999  | Main St       | Mamaroneck | NY    | 10543 | plans to move to 25 11th Newark NJ   |

602

119 John Smith 95 Multimedia manager multimedia entertainment good people skills not punctual need improve 119 100 10th Newark NJ 07105 alternate 19 Chatsworth Ave Larchmont NY 129 Judy White 67 Sports employee golf section diligent always on time 129 121 113th NY NY 10025 none 122 Joe Brown 77 Toy employee puzzles and electronic games technical wiz very pleasant 122 806 Columbus Ave NY NY 10026 none 406 Alice Morgan 60 Cosmetics high end fragrances takes a bit long to make a sale 406 1000 Hutchinson Ave Larchmont NY 10538 alternate 22 10th Newark NJ 023 Janice Brown 50 Toy entry level puzzles and electronic games need improve friendliness 9999 Main St Mamaroneck NY 10801 plans to move to 25 11th Newark NJ

METHOD AND SYSTEM FOR SEMANTIC-BASED QUERIES USING WORD VECTOR REPRESENTATION

TECHNICAL FIELD

This invention relates generally to databases and, more specifically, relates to semantic-based queries using word vector representation.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Databases are structured, or semi-structured, sets of data that are stored in a computer. Typically, databases provide a way to organize large amounts of data in such a way that the data can be efficiently accessed, managed, and updated. Relational databases are a certain type of database where data is organized by tables, records (tuples, rows), and columns. Relational databases provide certain relationships between database tables to increase the speed and efficiency over a regular database. A user can interact with relational databases using a query language, e.g. a structured query language (SQL). SQL may be activated interactively or programmatically.

SUMMARY

In one exemplary aspect of the embodiments described herein a method is provided, the method comprising method comprising: generating a set of token sequences for at least a portion of a database, wherein each token in a sequence represents a respective database entity of the database; assigning, for each token in the set of token sequences, at least one corresponding vector from a set of vectors of a same dimension, wherein the at least one corresponding vector encodes relationships between the database entity of a token and other database entities of other tokens of the set of token sequences; and extracting, using a query language, information from the database based at least in part on the relationships encoded by the assigned vectors.

In one exemplary aspect of the embodiments described herein an apparatus is provide. The apparatus comprising: at least one processor; and at least one non-transitory memory including computer program code, the at least one memory and the computer program code are configured to, with the at least one processor, cause the apparatus to: generate a set of token sequences for at least a portion of a database, wherein each token in a sequence represents a respective database entity of the database; assign, for each token in the set of token sequences, at least one corresponding vector from a set of vectors of a same dimension, wherein the at least one corresponding vector encodes relationships between the database entity of a token and other database entities of other tokens of the set of token sequences; and extract, using a query language, information from the database based at least in part on the relationships encoded by the assigned vectors.

In one exemplary aspect of the embodiments described herein, a computer program product is provided for extracting information from a database. The computer program product comprising a computer readable storage medium having program instructions embodied therewith, the program instructions executable by a device to cause the device to: generate a set of token sequences for at least a portion of a database, wherein each token in a sequence represents a respective database entity of the database; assign, for each token in the set of token sequences, at least one corresponding vector from a set of vectors of a same dimension, wherein the at least one corresponding vector encodes relationships between the database entity of a token and other database entities of other tokens of the set of token sequences; and extract, using a query language, information from the database based at least in part on the relationships encoded by the assigned vectors.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for semantic-based queries using word vector representation. Additional description of these techniques is presented after a system into which the exemplary embodiments may be used is described.

Figure 1:
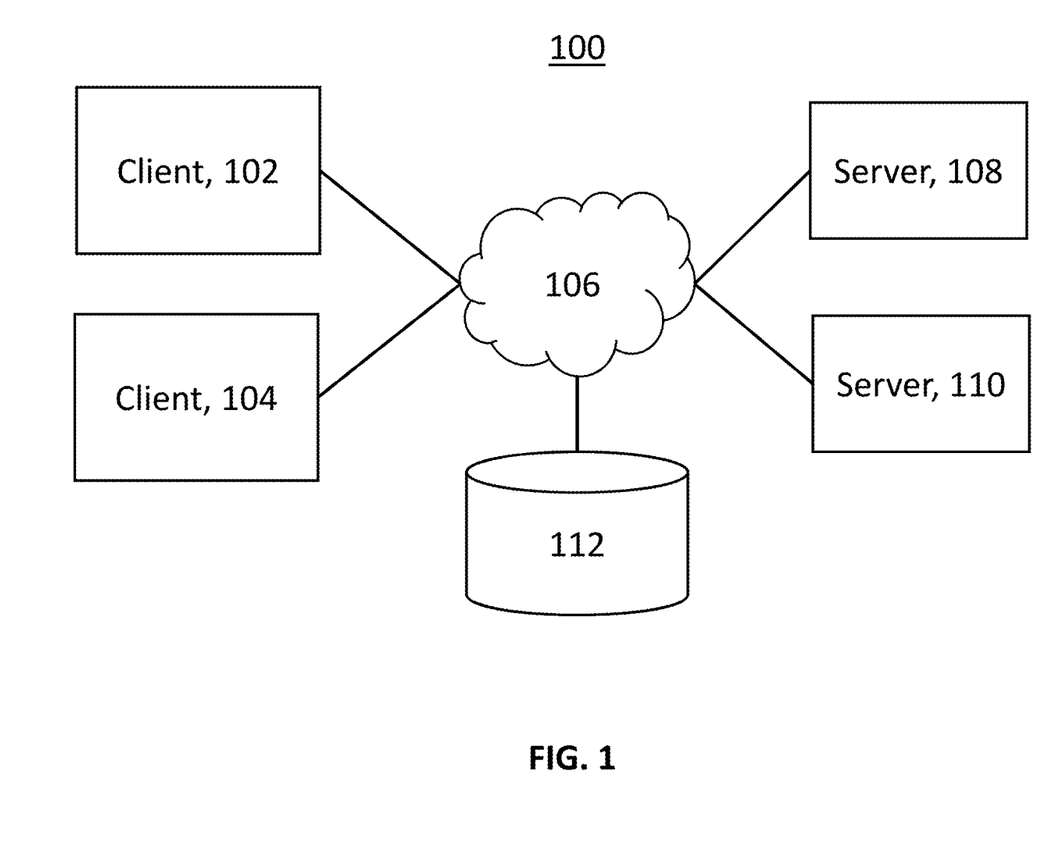
FIG. 1 illustrates a simplified block diagram of an example system environment in which exemplary embodiments may be implemented.

Referring to FIG. 1, this figure illustrates a simplified block diagram of an example system environment 100 in which exemplary embodiments may be implemented. The system environment 100 may include one or more client computers, 102, 104 connected to one or more servers 108, 110. The client computers 102, 104 may communicate with the servers 108, 110 via a network 106. One or more storage devices 112 may also be connected to network 106, and may include one or more databases. The client computers 102, 104 may also include a graphical user interface (GUI) as described herein. For example, the GUI may be used to interact with the storage device 112 by entering queries using a Structured Query Language (SQL). Although FIG. 1 shows only two client computers 102, 104, and two servers 108, 110 it should be understood that the system environment may include any number of client computers and servers.

In the example system environment 100 of FIG. 1, the network 106 may be any suitable network capable of supporting data communications using any suitable networking protocol, for example, TCIP/IP, IPX/SPX, SNA, and the like. The network 106 may be, for example, a local area network (LAN) or a wide area network (WAN). By way of example and without limitation, the network 106 may be: a wired network; a wireless network; the internet; an intranet; a cellular network; Bluetooth™; a Wi-Fi network; or any combination thereof. In some embodiments, the client computers 102, 104 and servers 108, 110 are able to access the storage device 112 through the network 106. In some embodiments, the client computers 102, 104 and the servers 108, 110 may each have their own databases.

The system environment 100 may include one or more storage devices 112 which may store one or more databases. Although the example in FIG. 1 shows the storage device 112 as part of the network 106, the location of the database(s) may also be on any one of the client computers 102, 104 and/or servers 108, 110.

Figure 2:
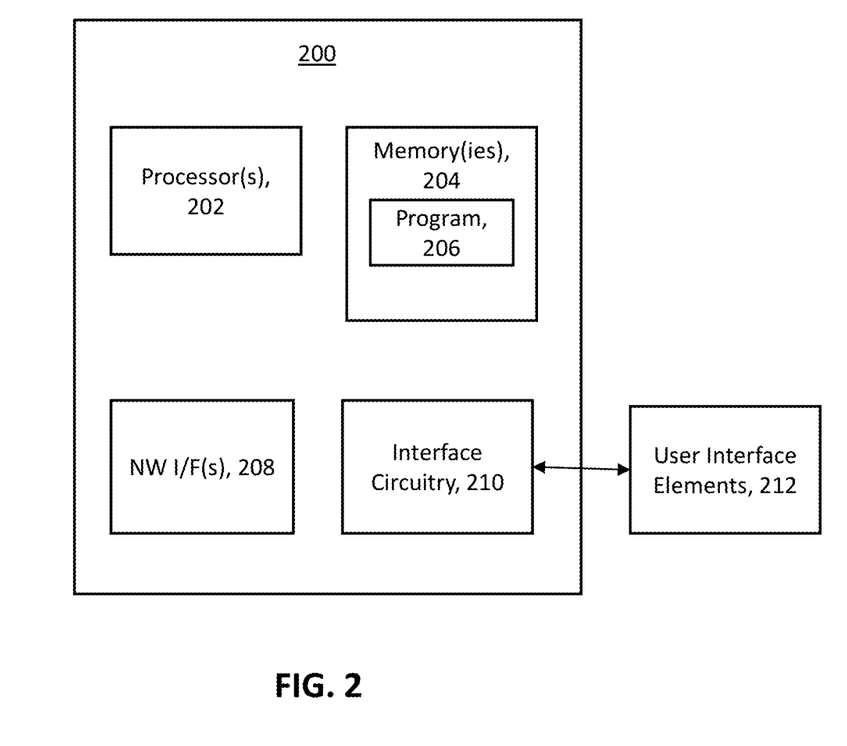
FIG. 2 illustrates exemplary implementations of the computer systems implemented in FIG. 1.

The high level block diagram of FIG. 2, shows a computer system 200 which may be used in any of client computers 102, 104 or servers 108, 110 of FIG. 1. The computer system 200 comprises one or multiple processors 202, one or more multiple memories 204 storing a computer program 206, one or more network (N/W) interfaces (I/F(s)) 208 and interface circuitry 210. The computer system 200 may include or be connected to one or more user interface elements 212. The one or more memories 204 may comprise functionality as described herein and comprises computer-readable code that, when executed by the one or more processors 202, cause the computer system 200 to perform the functionality described herein.

The computer readable memories 204 may be of any type suitable to the local technical environment and may be implemented using any suitable data storage technology, such as semiconductor based memory devices, flash memory, magnetic memory devices and systems, optical memory devices and systems, fixed memory and removable memory, or some combination of these. The computer readable memories 204 may be means for performing storage functions. The at least one processor 202 may be of any type suitable to the local technical environment, and may include one or more of general purpose processors, special purpose processors, microprocessors, gate arrays, programmable logic devices, digital signal processors (DSPs) and processors based on a multi-core processor architecture, or combinations of these, as non-limiting examples. The at least one processor may be means for performing functions, such as controlling the computer system 200 and other functions as described herein. The network interfaces 208 may be wired and/or wireless and communicate over the Internet/other network 115 via any communication technique. The user interface elements 212 may include, for instance, one or more of keyboards, mice, trackballs, displays (e.g., touch screen or non-touch screen), gesture detector and the like.

In general, the various embodiments of the computer system in FIG. 2 can include, but are not limited to workstations, servers, personal desktop computers, laptop or tablet computers, and even personal portable digital devices having wireless communication capabilities, including but not limited to handheld or wearable computers such as cellular phones and smart phones.

Figure 3:
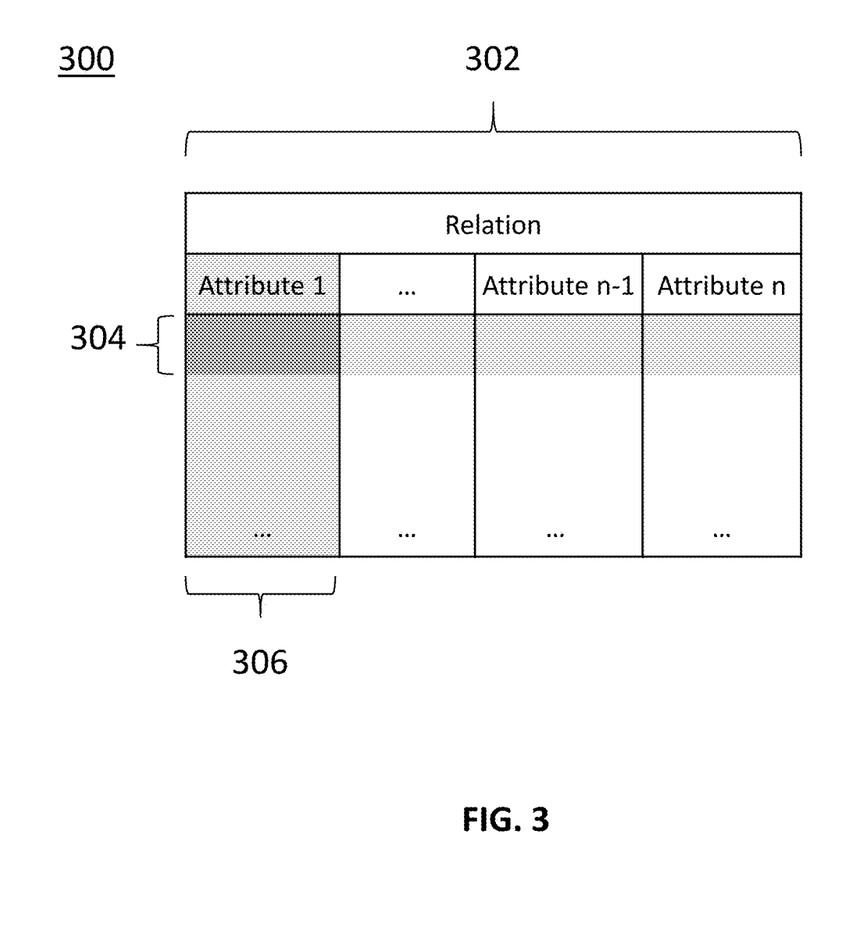
FIG. 3 illustrates an example structure of a database table according to embodiments described herein.

Referring now to FIG. 3, this figure shows an example database table 300 in a relational database having relation 302. The database table 300 has various rows, where each row is a database record 304, which may be denoted as r(tuple) where r is the name of the relation. Each database record 304 may contain values for the various attributes 306. Each column in database table 300 contains values for an attribute 306 originating in the various rows. It is also noted that relational databases make use of what is known as primary and foreign keys. A primary key is a single field or combination of fields that uniquely identifies a record. A foreign key is a collection of attributes in one table that constitute a primary key in another table. As an example, consider a relational database which has a publication table storing information about publications. In this case the relation 302 may be denoted as Pub, and may have the following attributes 306: name, topic, forum and pnum, which denote name of researcher, topic of paper, forum of presentation and paper number for a publication. Each data record may be denoted pub(name, topic, forum, pnum). In this case, the publication number pnum may be considered the primary key as it uniquely identifies each data record 304. Another table, say Projects, in the relational database may use a foreign key, say column pubnum in table projects, to point to a specific record via the primary key in the publication table. This may be accomplished by the SQL statement FOREIGN KEY (pubnum) REFERENCES pub (pnum).

As described in the background above, users may interact with databases using a query language such as SQL. Typically, users must have knowledge of the database schema to access the database. A database schema refers to how the database is organized, e.g., how the database is divided into tables for the case of a relational database. The database schema may control the facts that can be entered into the database or the data that may be of interest to the users. Even users familiar with a database schema may have difficult time extracting pertinent information due to the multitude of tables and the size of data that may be stored in the database. A user may interact with databases using software, such as database management system software (DBMSS). DBMSS comes in various varieties; the DBMS may be accessible from a querying interface of from DBMS calls embedded in application programs. In addition DBMS interfaces such as standard middleware APIs such as ODBC and JDBC. A DBMS may be embedded in a larger platform such as an application server or an integrated environment such as Spark. The invention described herein may seamlessly integrate with all these environments as follows. The additional features are at the level of SQL additions which are in line with the "spirit" of SQL as well as additional built-in vector handling constructs. It is also possible to realize an embodiment described herein with no modification at all to SQL by (a) using User Defined Functions (UDFs), (b) having a standard relation called Vectors(key: String, Value: float Vector[0 . . . m]) where the UDFs utilize the vectors and database fields to realize semantic querying.

Exemplary embodiments provide a user with a powerful and useful 'marriage' of machine learning technology and databases by embedding word vector technology into relational databases, as well as non-relational databases (e.g., XML, RDF). The user may then query 'text entities' and their closeness. This extends current database capabilities that predominantly operate in the syntactic domain that is—computing numbers, comparing strings, finding substrings, counting string occurrences and using synonyms as the only semantic capability. The user may also navigate (join) a database without having a detailed knowledge of the schema, and query intelligently across different databases employing a different nomenclature. Embodiments described herein enable a user to intuitively and meaningfully query a database with terms that are not even mentioned in the database.

Distributed Language Embedding refers to assigning a vector to each word, term, concept, or more generally item, where the vectors indicate various aspects of the associated words, including semantic "closeness". Embodiments described herein may use Distributed Language Embedding to expose hidden text entity relationships in structured databases. The term "text entity" is used herein to refer to some discernible item appearing in a database (or some external source), such as a word, a number, a meaningful short sequence such as 'Theory of Relativity'. A 'word vector' is a vector representation of words in a language. The methods for obtaining these vector representations range from "brute force" learning by various types of Neural Networks, to log-linear classifiers and to various matrix formulations, such as matrix factorization techniques. One example, is a tool called 'word2vec' which produces vectors that capture syntactic as well as semantic properties of words. Word2vec scans a corpus (text) to generate vector representations for each word in the document. A word vector is usually of a low dimension (about 100-300) and represents the word. The vectors can be used to compute the semantic and/or grammatical closeness of words as well as test for analogies, e.g., "a king to a man is like a queen to what?"

The client computers 102, 104 and servers 108, 110 of FIG. 1 may perform any of the techniques described above for generating word vectors, and thus may be called machine learning devices. Further, the vectors may be generated by a cloud-based computing platform. Additionally, the number of dimensions of the vectors may be indicated by the user, or set to some predetermined value. Likewise, the trained vectors may be stored in memory, e.g. memory(ies) 204 of FIG. 2, or stored in the cloud.

According to exemplary embodiments described herein, database entities, such as a word, a number, a field (column) of a row, a whole table row (i.e., tuple) or even a whole relation, are each associated with a vector that captures the database entity's inter-relationships with all other such entities. The closeness of such entities may be determined by simple vector operations. Further, the learning (or training) of the vectors may be accomplished via Machine Learning (ML) techniques and may be carried out on entity sequences that are derived from the database itself. This provides two perceptions of a database: the typical relational one and the text one. The text perception of the database may be analyzed, and a low dimensional, e.g. 200, vector representation may be assigned to each token. According to some techniques, tokens that co-occur often are assigned vectors whose cosine distance is relatively high. The vectors may also be used in checking analogies using simple vector operations. A token is a sequence of "characters" with no intervening blanks Each token represents a text entity, and the entities relate to each other. This relationship may be expressed numerically, e.g. cos(e1,e2)>0.5. Here cos is the cosine distance between two vectors. The relationship may also be expressed verbally on a scale, for example very strong, strong, moderate, weak, very_weak, e.g. strong(e1, e2). which enables defining the numeric values separately, e.g. very_strong=0.95. For example, understanding the relationship between the two text entities 'John' and New York' includes deriving the tokens for the text entities, such as V_John and V_New_York, and performing an algebraic operation on the two vectors, for example cosine distance. If the cosine distance between V_John and V_New_York is high (i.e. closer to 1) than the two text entities are closely related; if the cosines distance is low (i.e. closer to −1) the two entities are not closely related.

According to exemplary embodiments, the two perceptions of the database are merged. This may be done by adding procedures to the query language SQL in the form of user defined functions (UDF) to capture this capability, and extending the query language SQL with text-entity vector related constructs. Accordingly, more expressive queries may be formed in standard SQL, and databases with a large number (e.g. hundreds, thousands) of relations may be queried without relying on deep schema knowledge. In other words, certain 'connections' may be made using the vectors without regard to the schema. It is noted that the word-vector techniques may also handle non-textual fields (e.g. numeric columns) by assigning them a textual representation. For example, if the value of a record for an integer column is '7', then the integer 7 may be converted, for example, into a string "7" or a string "seven".

According to an embodiment, UDFs may be implemented by obtaining vectors by training on text sequences extracted from the database itself. Each text entity in the database may be associated with a vector of a prescribed dimension (e.g. 200). Certain procedures may utilize such vectors. One example UDF is as follows:

$$\text{proximityMax(a:string, b:string) returns a float between } -1 \text{ and } 1 \qquad (1)$$

The UDF proximityMax "chops" strings a and b into substrings a1, . . . , an and b1, . . . , bm based on space separation. For example, if string a="foundations of databases", then proximityMax chops string a into the following substrings: "foundations", "of", "databases". Then, proximityMax calculates the 'closeness', denoted $C_{ij}$, of string a and string b by cosine_distance($V_{ai}, V_{bj}$), where $V_{ai}$ is the vector of ai and $V_{bj}$ is the vector of bj, for i=1, . . . , n and j=1, . . . , m. Then, proximityMax returns the largest such $C_{ij}$ value.

A second example UDF is as follow:

$$\text{proximityAvg(a:string, b:string) returns a float between } -1 \text{ and } 1. \qquad (2)$$

Similar to proximityMax, proximityAvg "chops" strings a and b into sub-strings a1, . . . ,an and sub-strings b1, . . . , bm based on space separation. Then, proximityMax computes the average vectors, $VAVG_a$ and $VAVG_b$, of $V_{a1}, . . . , V_{an}$ and $V_{b1}, . . . , V_{bm}$, respectively. Then, proximityAvg returns a value equal to the cosine_distance ($VAVG_a, VAVG_b$).

In both of the example UDFs described above commonly occurring entities are ignored. For example, the following strings may be ignored: 'on', 'up', 'down', 'a', 'the', 'their', 'its', 'his', 'her', 'and', 'or', 'not', 'of', 'in', 'for', 'using'.

The example UDFs may be registered in a standard SQL database system (e.g. DB2) and may be utilized in queries. For example, the following query (in Spark SQL) includes the proximityMax UDF:

SELECT X.number, X.author, X.title, Y.number, Y.author, Y.title, proximityMax(X.title, Y.title) AS proximityMax
FROM papers X, papers Y
WHERE
    int(X.number)<int(Y.number) AND
    proximityMax(X.title, Y.title)>0.3
LIMIT 10

The example UDF above returns up to 10 results, where each result will list author 1, title 1, year 1, author 2, title 2, year 2 such that title 1 and title 2 are concerned with at least one similar topic. The statement "int(X.number)<int(Y.number)" prevents a row from being compared to itself.

Another example query using proximityAvg is:
SELECT X.number, X.author, X.title, Y.number, Y.author, Y.title, proximityAvg(X.title, Y.title) AS proximityMax
FROM papers X, papers Y
WHERE
    int(X.number)<int(Y.number) AND
    proximityAvg (X.title, Y.title)>0.2
LIMIT 15

The example UDF above (also in Spark SQL) returns up to 15 results, where each result lists author 1, title 1, year 1, author 2, title 2, year 2 such that title 1 and title 2 generally deal with similar topics (used Avg). Note that 0.2 is used instead of 0.3 in the previous call as the average correlation will tend to be lower. Note also that excluding commonly occurring terms will enhance accuracy. In general, the exact set of terms to be excluded could also be a parameter. Also, splitting a string on spaces (blanks) may be changed to splitting of other forms, e.g. on commas.

The two example UDFs described above are only illustrative and a person of ordinary skill in the art would appreciate that additional such procedures may be defined. For example, proximityTop3 Avg(a:string, b:string) returns a float between −1 and 1; where proximityTop3 Avg is similar to proximityAvg but only considers the top 3 cosine_distances between an ai and a bj, and returns the average of these 3 values. Similarly, proximitySecondMax excludes the maximum $C_{ij}$ and then returns the maximum remaining $C_{ij}$. Although UDFs are typically used in query languages, it should be appreciated that the type of UDFs described above would not be possible without embodiments described herein.

As another example, consider the following two entities: entity1="Production and consumption of university LinkedData"entity2="Language Innovation and Change in On-line Social Networks" A UDF, uses the vectors for each component of the entities (e.g. vector("Production") and vector("Innovation")) to compute relationships using inter-vector cosine distance. For example, the UDF proximityMax (entity1, entity2) returns the maximum cosine distance between the pair of vectors for each pair of words in the two entities, proximityAvg(entity1, entity2) returns the average cosine distance and proximityMaxSecond(entity1, entity2) returns the second maximum cosine distance. In general, one can have a family of proximity functions.

Another example of a UDF is for computing analogies, e.g., analogy_dist(word1, word2, word3, word4) computes the cosine distance between the vector of word "word4 " and the vector resulting from word1+word2−word3. This can be used as follows where Word is a one column relation containing single entities (e.g., drug names, the variable names Vking, Vman, Vwoman are arbitrary and could be uniformly replaced by, say, U1, U2, U3):

SELECT Vking, Vman, Y, Vwoman
FROM Vking Word, Vwoman Word, Vman Word, Y word)
WHERE analogy_dist(Vking, Vwoman, Vman, Y)=
    SELECT Max(analogy_dist(Vking, Vwoman, Vman, Y1)
    FROM Y1 Word
    GROUPBY Vking, Vwoman, Vman According to certain embodiments described herein, SQL may be extended by adding text entities as "first class citizens". In a programming language, first class citizens support all the operations that are generally available to other entities. Adding text entities as first class citizens may be accomplished, for example, by adding a phrase 'Text Entity e' in the FROM part of a SQL query. The appearance of a text entity in a tuple field is checked using the following predicate: R.column contains entity. The appearance of a text entity in a tuple may be checked as follows: R.* contains entity. The appearance of a text entity in a relation may be checked as follows: R contains entity. The appearance strength of a text entity in a tuple field may be checked as follows: R.column contains more than 50 occurrences of entity; or R.column contains less than 40 occurrences of entity. Similarly for a whole tuple, a whole relation or the whole database.

Relations may be navigated using entities in a similar way as database keys. For example, the following query checks for the existence of two strongly related (cos_distance>0.75) text entities in the address field of an employee and a row (tuple) in the DEPT table (relation):

SELECT EMP.Name, EMP.Salary, DEPT.Name
FROM EMP, DEPT, Entity e1, e2;
WHERE
    EMP.Address contains e1 AND
    DEPT.*.contains e2 AND
    cos_distance(e1, e2)>0.75

Relation variables may also be introduced to further enhance the functionality of SQL. introducing relation variables as follows:

SELECT EMP.Name, EMP.Salary, S.?1
FROM EMP, DEPT; Entity e1, e2; Relation S;
WHERE
    EMP.Address contains e1 AND
    S.?1.contains e2 AND
    cos_distance(e1, e2)>0.75 AND
    S.?1.column contains more than 1 occurrences of e2

In this example query, field (attributes) values are retrieved from EMP and the (unknown) relation(s) S and column(s) ?1 such that there are text entities e1 and e2 that link them. The "related" relation and column names and the relevant values may also be retrieved. Intuitively, we retrieve names and salaries from EMP and tuple columns X out of some other relation S such that the tuple in EMP.Address contains an entity e1, the tuple in S's column X contains an entity e2 and e1 and e2 are "close" (cos_distance>0.75) and has more than 1 occurrence of text entity e2. In general there may be more than one column in a qualifying relation that qualifies and there may be more than one qualifying relation, and as such, the construct S.?1 should indicate the relation and column names. For example, a result tuple may look like: ('John Smith', 112000, Dept.Mgr:'Judy Smith').

The UDFs mentioned above may be implemented using a variety of programming languages. For example, the proximityMax, proximityAvg, and cos_distance functions mentioned above may be implemented using the following Python code:

```
connectors = ["on", "up", "down", "an", "a", "the", "their", "its", "his",
"her", "and", "or", "not", "of", "in", "for", "using"]
def proximityMax(field1, field2):
    list1 = field1.split(" ")
    list2 = field2.split(" ")
    max = -2.0;
    cosvalue = -2.0
    for e1 in list1:
        if not e1 in connectors :
            for e2 in list2:
                if not e2 in connectors :
                    v1 = locateVector(e1)
                    v2 = locateVector(e2)
                    cosvalue = cos(v1, v2)
                    if cosvalue > max:
                        max = cosvalue
    return max
def proximityAvg(field1, field2):
    list1 = field1.split(" ")
    list2 = field2.split(" ")
    isempty1 = 1
    isempty2 = 1
# calculate sum vector for e1
    flag = 0
    for e1 in list1:
        if not e1 in connectors :
            isempty1 = 0
            v1 = locateVector(e1)
            if flag == 0:
                flag = 1
                Vavg1 = v1
            else:
                for i, a in enumerate(v1):
                    Vavg1[i] = str(float(Vavg1[i]) + float(v1[i])) # highly
                        inefficientt
    len1 = float(len(list1))
    for i, a in enumerate(Vavg1):
        Vavg1[i] = str( float (Vavg1[i])/len1 ) # calculate
            average
# calculate sum vector for e2
    flag = 0
    for e2 in list2:
        if not e2 in connectors :
            isempty2 = 0
            v2 = locateVector(e2)
            if flag == 0:
                flag = 1
                Vavg2 = v2
            else:
                for i, a in enumerate(v2):
                    Vavg2[i] = str(float(Vavg2[i]) + float(v2[i]))
    len2 = float(len(list2))
    for i, a in enumerate(Vavg2):
        Vavg2[i] = str( float (Vavg2[i])/len1 ) # calculate
            average
    cosvalue = -2
    if (isempty1 == 0 ) and (isempty2 == 0): # make sure Vavg1 and
Vavh2 were assigned
        cosvalue = cos(Vavg1, Vavg2)
    return cosvalue
def cos(vector1, vector2):
    len1sq = 0.0
    for a in vector1:
        len1sq = len1sq + float(a) * float(a)
    len1 = math.sqrt(len1sq)
    len2sq = 0.0
    for a in vector2:
        len2sq = len2sq + float(a) * float(a)
    len2 = math.sqrt(len2sq)
    sum = 0.0
    for index,a in enumerate(vector1):
        sum = sum + float(vector1[index]) * float(vector2[index])
    if (float(len1 * len2) == 0):
        return -1
    return sum/ float(len1 * len2)
```

According to some embodiments of the invention, training of word vectors may be performed on text entity sequences derived from the database or parts thereof. Text entities may be employed which are derived from a number of databases or portions thereof. A data source different than the database intended to be queried may also be used, for example, a publicly available source such as dblp and Wikipedia; here, a token may be a word appearing in Wikipedia, or a highlighted concept appearing in Wikipedia. Often, such a concept is made of multiple words and the token may be formed from these words, e.g. Los_Angeles_Lakers; token sequences may be formed by listing the tokens in the sequence of appearance in the Wikipedia text; it is also possible to have the sequences contain both single word tokens as well as multi word sequences, for example Los Los_Angeles_Lakers Angeles Lakers. This kind of generating a token sequence may also apply to database fields containing multiple text entities. Any combination of the above may also be used.

Additionally, the training corpus may be enlarged and enhanced by using foreign keys. A foreign key is a field in one table that uniquely identifies a row in another table. For example, assume a relational database D with relations R1 and R2, and f1 is a column in R1 which is a foreign key into R2 and column f2 is the key of R2. Further assume, a tuple, t, in the join of R1 and R2 on f1=f2, namely the foreign key value equals the key value. According to certain embodiments, t is converted into text denoted text(t) and added to the corpus (i.e. by concatenating it to the sequence generated from the database). This concatenation is natural in the sense that the foreign key value in a tuple corresponding to a database conceptual entity (e.g., Department d) uniquely identifies a related database entity (e.g. Manager m) and so the token sequence would intuitively list tokens associated with the department d followed by tokens associated with d's manager m. As this concatenation is natural, the corpus now embeds, in the sequence, closeness "through" the foreign key. This technique may also be extended to multi-column foreign keys.

According to some embodiments, training may be confined to a set of derived tables derived from the database via queries (or defined as views). This will transform the set of relevant text entities into a new set, which may be a more focused set, based on these derived tables. For example, a multinational corporation may have a database encompassing many countries. A user can define queries that extract only portions relevant to FRANCE and use it for training purposes.

According to some exemplary embodiments, given a corpus, C, of text entities (which may be from the whole database or portions thereof), a number of distinct sets of vectors are kept where each set has a vector for each entity e in C. The difference between two sets of vectors may be, for example, in their dimensionality. For example, one set may have vectors of 100 dimensions and the other set have vectors of 300 dimensions. Generally, more dimensions translates to better accuracy but may also incur a higher operational cost. Another example may be sets of vectors that were trained at different times or via different training methods. Finally, since views define different contexts, each entity can have one or more vectors.

According to some embodiments, when the database changes (e.g. information is added, modified, deleted) the vectors may need to be updated. Updating the vectors may include computing vectors for newly introduced entities as well as adjusting entries of previously trained vectors. One exemplary technique for computing vectors for new entities is computing the vectors from scratch. Another exemplary technique is to train the vectors anew where the starting vectors are the existing ones and where changes to existing vectors are applied with a reduction factor, for example, by applying only a fraction of the change on vector entries that would have been applied under regular training.

The embodiments described above may also be extended to navigate over distinct databases. For example, the training may be done on the concatenation of the sequences derived from the database or on some 'globally known' source such as dblp or Wikipedia. Word vectors may also be used to partition relations into sub-relations, via clustering, based on the "closeness" of tuples as vectors may extend to whole tuples. There are numerous available vector clustering algorithms.

Some exemplary embodiments may also apply to non-relational databases such as XML, RDF, JSON and others. In particular for hierarchical databases (e.g., XML) in generating a set of token sequences, a user may also include element names and not just text and values. In generating a set of token sequences the user may traverse a set of root to leaf paths, generated randomly to capture the various hierarchical relationships as well as level-wise traversals that capture the sibling relationships. The above traversal techniques may also be combined.

Some exemplary embodiments may also apply to scenarios where some of the data is multi-modal, e.g., images, video or audio files. For these cases, a UDF may extract features from these datasets (e.g., images), and these features may be used as entities along with the other text values to generate a set of tokens sequences which may then be trained as described above.

Figure 4A:
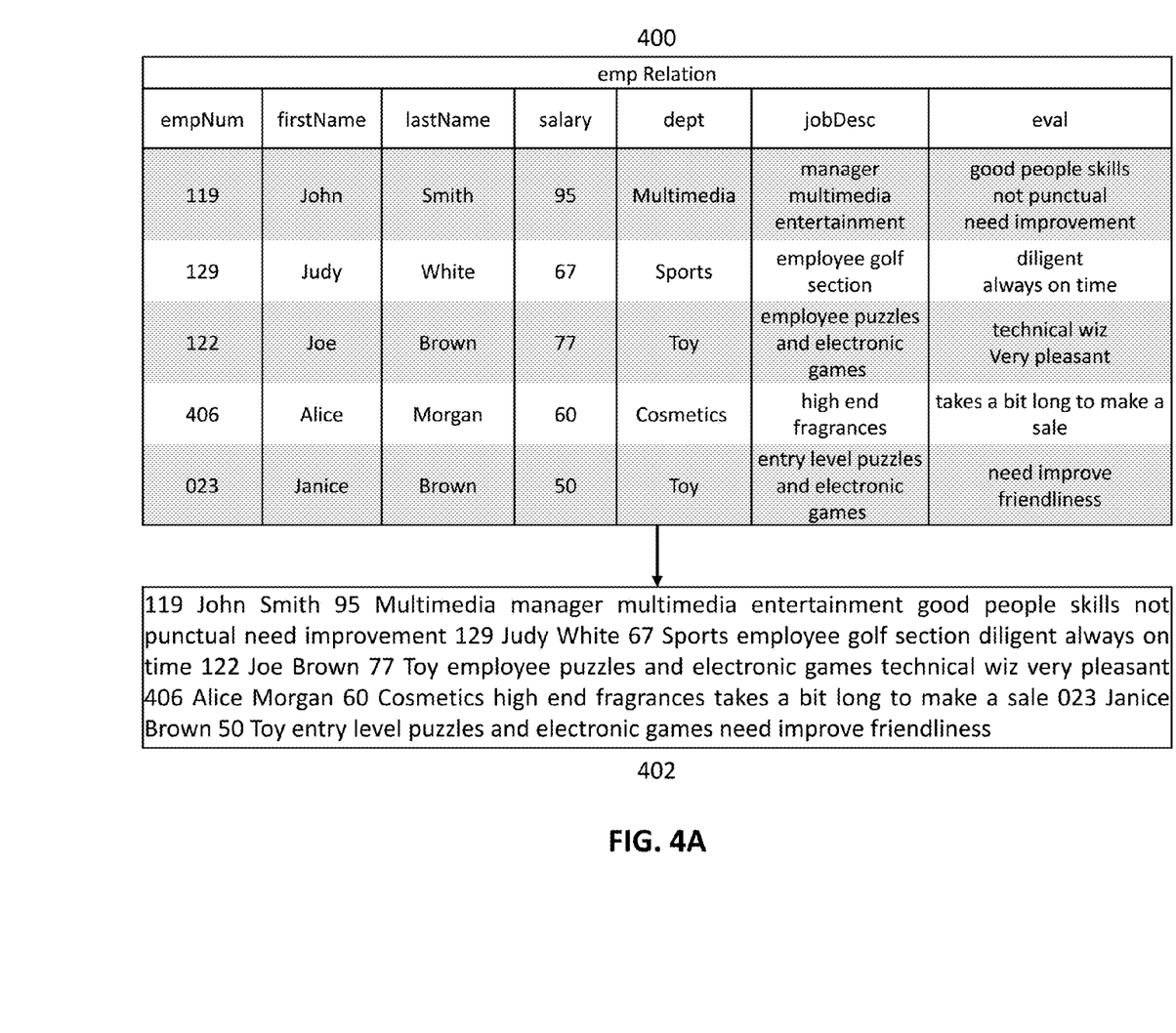
FIG. 4A and FIG. 4B illustrate an overview of a process for obtaining word vectors from an example database table according to embodiments described herein.
Figure 4B:
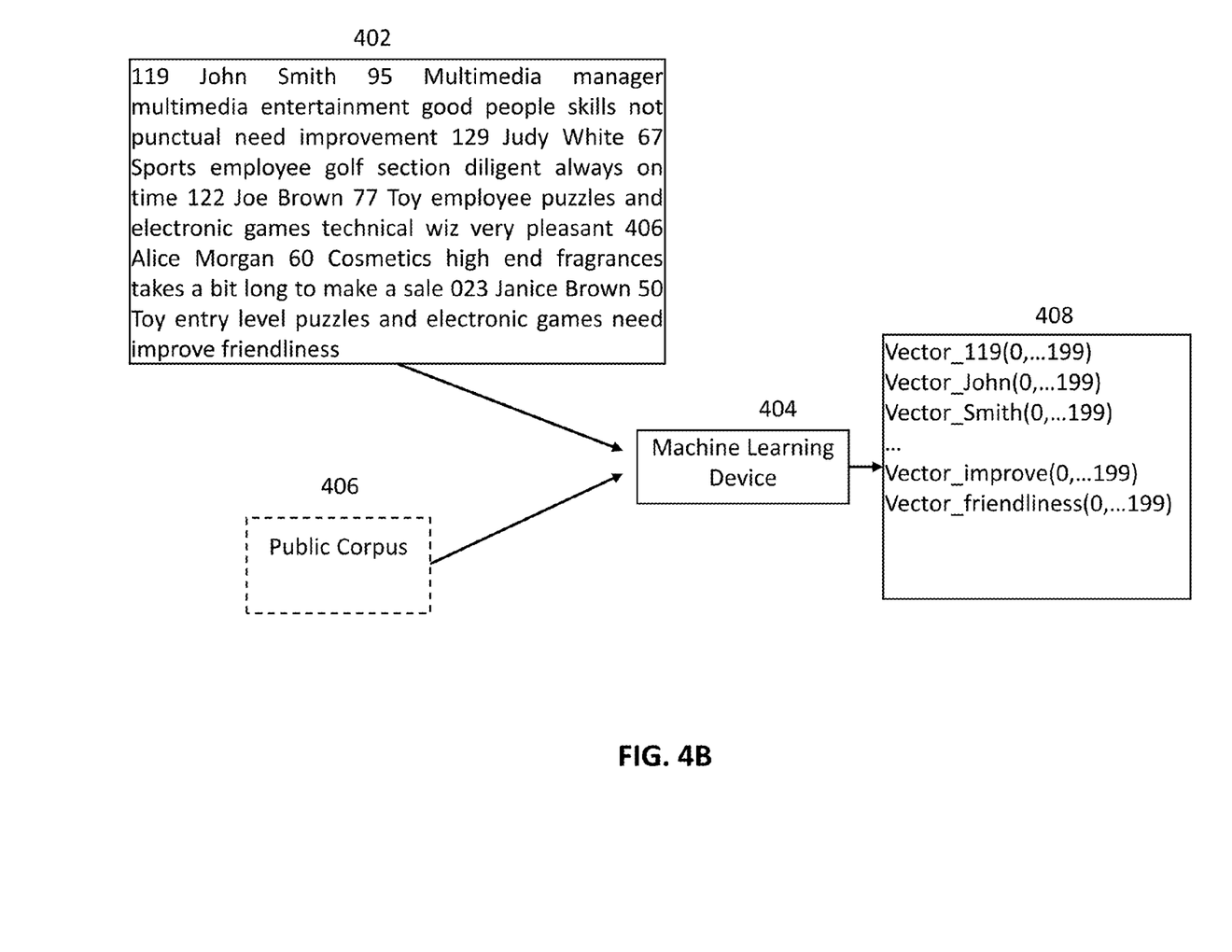
Figure 5:
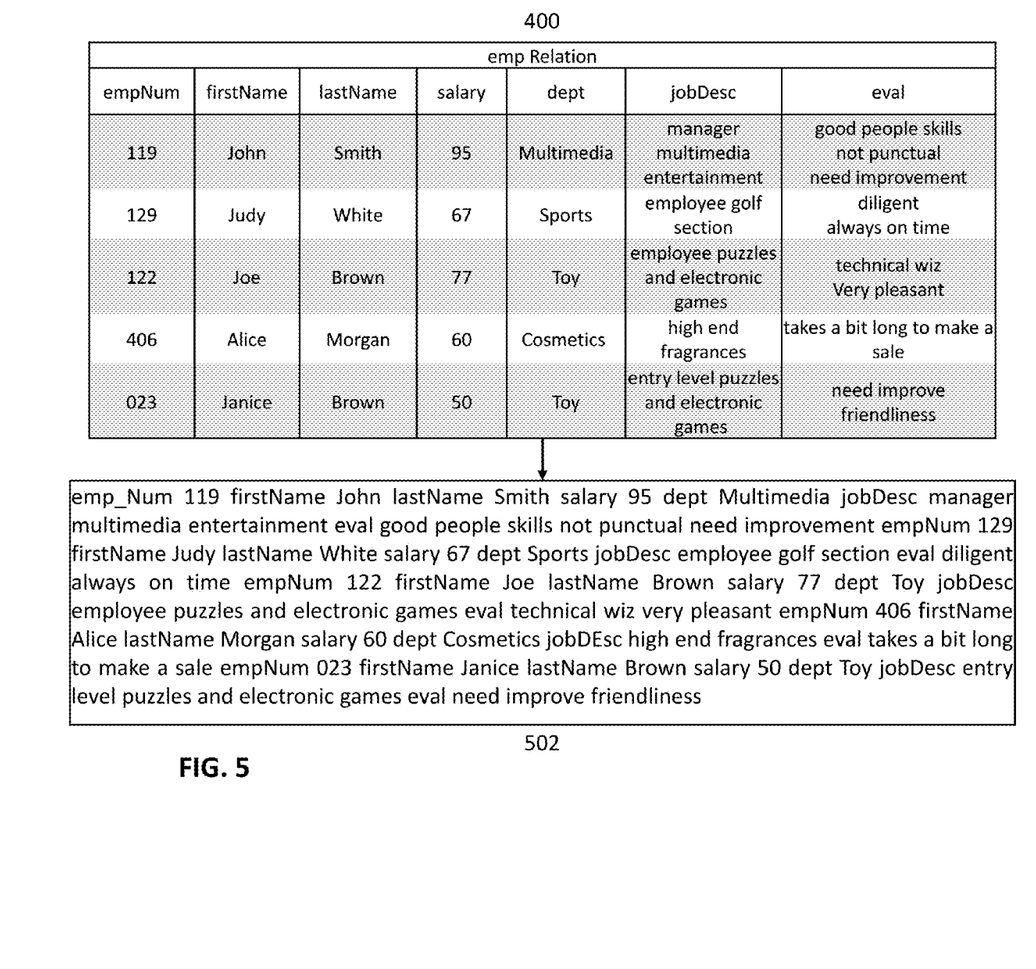
FIG. 5 illustrates an alternative to the sequence presented in FIG. 4B which introduces column names in as sequence tokens.

FIGS. 4A, 4B and FIG. 5 illustrate two examples of databases tables and resulting textual representations of the database tables according to embodiments described herein. Referring first to FIG. 4A and FIG. 4B, this figure shows an example database table 400 which includes five records of employee information. The database table 400 is named, emp, and has the following seven attributes: empNum, firstName, lastName, salary, dept, jobDesc, and eval. According to embodiments described herein, a set of token sequences (which in this case consists of one sequence as depicted in the 402 frame) 402 is created from database table 400. The set of token sequences 402 is a textual representation of the five records of employee information stored in the database. In this example, the set of token sequences 402 may be considered a corpus.

In FIG. 4B the set of token sequences 402 (which may also be referred to as a corpus) is fed into a machine learning device 404. Optionally, other information may be fed into the machine learning device 404, for example a public corpus 406 such as Wikipedia. The machine learning device 404 then outputs vectors 408 representing the closeness of words in the database table 400. The database entity 'John' in the example shown in FIG. 4B is assigned a vector of 200 dimensions, denoted by the vector Vector_John(0, . . . 199). However, in other examples a different number of dimensions may be used as long as all vectors in the set of vectors in an application are of the same dimension Typically, if a user would like to gather information regarding an employee's salary and then the user would have to be familiar with the attributes names of database table 400. For example, if a user wanted to gather information about employee's salaries, then the user must construct a SQL query which specifically states the attribute name 'salary'. However, by incorporating the vectors 408 a user gains the ability to construct queries with terms that are not in the database when the training includes a rich external source, such as Wikipedia, as noted above. For example, in an embodiment the set of token sequences 402 of FIG. 4A may also include the column names (i.e. attributes) of the database table 400, as shown in the set of token sequences 502 of FIG. 5 (which actually consists of a single token sequence 502). The decision whether to include these column names may be left to a user to determine. According to this embodiment, the set of token sequences 502 would be "emp_Num 119 firstName John lastName Smith salary 95 dept Multimedia jobDesc manager multimedia entertainment eval good people skills not punctual need improvement . . . ". Further suppose that other relations include columns such as "bonus", "fine", "sales" and the like. Then, the user may construct a query regarding Smith's financial records by simply stating:

SELECT R?.*
FROM emp e
WHERE
 contains(e, "Smith") AND
 cos(e, "money")>0.5

So, although "money" is not mentioned at all in the database, any tuple in any relation that mentions "Smith" and "salary", "sale", "bonus", "fine", "IRA" will be retrieved because of the associated vectors 408 closeness as established by the learning process. This type of functionality is not otherwise available to database users without the embodiments described herein. Additionally, when the set of token sequences is produced using foreign keys (which are discussed in further detail with respect to FIG. 6), tuples may be retrieved that are connected to "Smith" via one or more "hops" through relations by following foreign keys. So, a tuple that does not mention 'Smith' may well be retrieved if it deals with a financial aspect connected to Smith (for example, sales made by Smith). So, a user may query the sales relation for sales made by Smith even though 'Smith' is not explicitly mentioned via:

SELECT s.*
FROM sales s
WHERE
 maxProximity(e, "Smith")>0.3 AND
 cos(e, "money")>0.5

The set of token sequences 402 in FIG. 4A and the set of token sequences 502 in FIG. 5 are only examples of how token sequences may be derived from a database, and the token sequences may also be derived from the database in other ways. For example, the tokens corresponding to John Smith's jobDescp (i.e. "jobDesc manager multimedia entertainment" in the sequence of tokens 502) may instead be derived as "jobDesc manager jobDesc multimedia jobDesc entertainment", in which case the resulting trained vectors would likely show a stronger relationship between the vector of word 'jobDesc' and the word vectors of 'manager', 'multimedia', and 'entertainment'.

Figure 6:
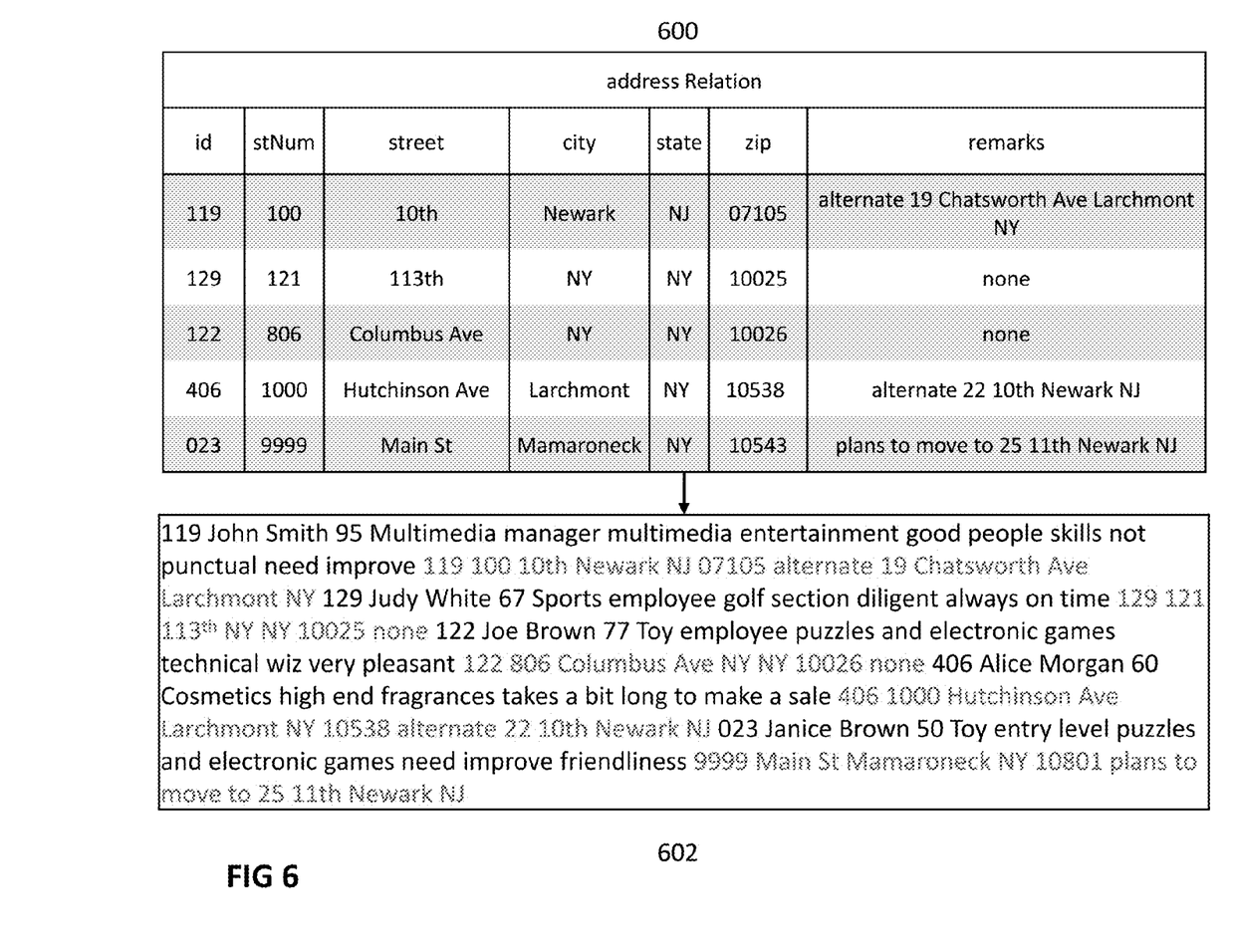
FIG. 6 illustrates another example database table including foreign keys and a resulting set of token sequences according to embodiments described herein.

Referring now to FIG. 6, this figure represents another example of a database table, i.e. database table 600, and a resulting set of token sequences (which in this case consists of one sequence of tokens) 602 according to embodiments described herein. This database table 600 provides the addresses for the employees of database table 400. In FIG. 6, the resulting entity sequence 602 is based on foreign key empNum in emp which provides a value for key attribute 'id' of the address Relation of database table 600. Using foreign keys in generating the set of token sequences provides a user with the ability to make connections between entities of database tables that are not evident or encoded in the database. For example, if many news articles mention Mamaroneck and Larchmont together then the vectors of these entities will be close. If a user constructs a query to locate employees that live close to each other and Alice Morgan lives on "9999 Main Street, Mamaroneck" and Janice Brown lives on "1000 Hutchinson Ave Larchmont", then maxProximity("9999 Main Street Mamaroneck", "1000 Hutchinson Street Larchmont") is high because the cosine_distance(Vector_Mamaroneck, Vector_Larchmont) is high.

In exemplary embodiments, the database needs to be tokenized for queries to operate properly. Accordingly, each token needs to be assigned a vector. One way to ensure this is to always train the database originating sequences along with any optional external sources, so that that all the database tokens are assigned vectors. However, some example embodiments do not require the database sequences to be included in the training. For example, if vectors have already been trained over an external source then these vectors may be assigned to the identical database tokens. It is possible that there are some database tokens are not in the external source, in which case a 'default' average vector may be assigned to these database tokens. The 'average vector' may, for example, be a vector whose i'th entry is the average of all the i'th entries of vectors in the set.

It is further noted that using an external source to train a set of vectors is useful when the external source contains at least some token that are related to the information of the database. If the external source has nothing in common to the tokens in the database then the resulting vectors are not expected to be particularly useful. Similarly, more relevant external sources will produce more accurate and pertinent vector relationships. For example, a database containing complex medical terminology may benefit more from vectors that were trained using text sequences from professional medical journals such as the New England Journal of Medicine.

Figure 7:
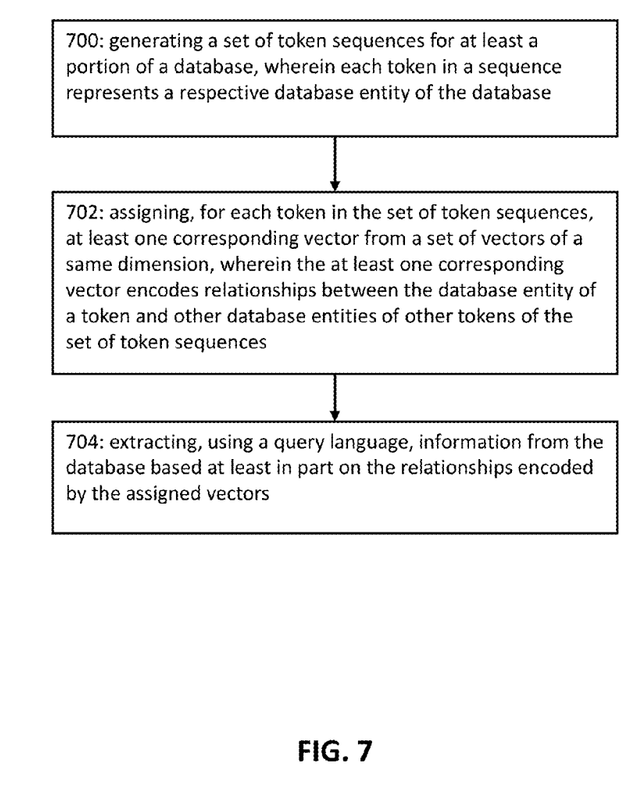
FIG. 7 is a logic flow diagram for semantic-based queries using word vector representation, and illustrates the operation of an exemplary method, a result of execution of computer program instructions embodied on a computer readable memory, functions performed by logic implemented in hardware, and/or interconnected means for performing functions in accordance with exemplary embodiments.

FIG. 7 is a logic flow diagram for semantic-based queries using word vector representation. FIG. 7 illustrates the operation of an exemplary method, a result of execution of computer program instructions embodied on a computer readable memory, functions performed by logic implemented in hardware, and/or interconnected means for performing functions in accordance with exemplary embodiments. It is assumed that a server, e.g. server 108 of FIG. 1, performs the blocks in FIG. 7, but the blocks may also be performed in a cloud computing environment or by a client computer (e.g. client computer 102 of FIG. 1).

Referring to FIG. 7, an example method may comprise generating a set of token sequences for at least a portion of a database, wherein each token in a sequence represents a respective database entity of the database as indicated by block 700; assigning, for each token in the set of token sequences, at least one corresponding vector from a set of vectors of a same dimension, wherein the at least one corresponding vector encodes relationships between the database entity of a token and other database entities of other tokens of the set of token sequences as indicated by block 702; and extracting, using a query language, information from the database based at least in part on the relationships encoded by the assigned vectors as indicated by block 704.

A token sequence from the set of token sequences may comprise at least one token and each token may represent one of: a word, a whole tuple field, a sub-field of a tuple field, a tuple or parts thereof, a relation name, a database name, a column name, an element name, an attribute name, a constructor name; and where a token sequence represents one of: a whole tuple field, a sub-field of a tuple field, a tuple or parts thereof, a whole relation, a whole database, a subset of a database, or a sub-tree of a database. The method may further comprise training a machine learning device to generate the set of vectors, wherein the machine learning device may be trained on at least one of: the set of tokens sequences; and a second set of token sequences derived from an external source of entity sequences. The external source of entity sequences may be at least one of: a private database; a private corpus; a public database; and a public corpus. The machine learning device may be one of a word-vector associating device, word2vec, Glove, Loglinear Generative Model, or a Neural Network. The query language may include at least one of: constructs which relate a strength of the relationships between a token and another token at least one of said tokens of the set of token sequences; and relation variables. The constructs may include at least one of the following constructs: the construct contains(R1.column1, e) where e is an entity variable; and the construct cos_distance(e1, e2)>c where e1, e2 are entity variables and c denotes a constant. The constructs may employ a scale to express strength of connection, wherein the strength of the connection may be measured by a function applied to at least one of: a vector from the set of vectors, and a vector obtained from performing algebraic vector operations on vectors in the set of vectors and a specified constant vector. The function may be at least one of: a cosine distance between two vectors of the same dimension; a Euclidean distance between two vectors of the same dimension; a Squared Euclidean distance between two vectors of the same dimension; a Minkowski distance and between two vectors of the same dimension; a Chebyshev distance between two vectors of the same dimension; a variation of one of the above functions. The same dimension may be one more than one dimension. The set token sequences may include at least one of: a token sequence obtained by following foreign keys and IDREF references; and a token sequence obtained by following paths in a database tree, wherein the database is hierarchical. The method may further comprise updating the set of vectors when the database is modified including vector values. The database may be at least one of: an index that for a given database entity returns database elements containing database entities having a specified strength of connection with the given entity; and a structure associating database entities to their respective vectors. The database may be one of Relational, JSON, XML, RDF and the query language may be one of SQL, Xpath, Xquery, SPARQL, HQL, Spark. The relationships may be at least one of: semantic relationships; and syntactic relationships.

An example embodiment may be provided in an apparatus, for example any one of the client computer 102, 104 or servers 108, 110 of FIG. 1. The apparatus may comprise: at least one processor; and at least one non-transitory memory including computer program code. The at least one memory and the computer program code may be configured to, with the at least one processor, cause the apparatus to: generate a set of token sequences for at least a portion of a database, wherein each token in a sequence represents a respective database entity of the database; assign, for each token in the set of token sequences, at least one corresponding vector from a set of vectors of a same dimension, wherein the at least one corresponding vector encodes relationships between the database entity of a token and other database entities of other tokens of the set of token sequences; and extract, using a query language, information from the database based at least in part on the relationships encoded by the assigned vectors.

A token sequence from the set of token sequences comprises at least one token and each token represents one of: a word, a whole tuple field, a sub-field of a tuple field, a tuple or parts thereof, a relation name, a database name, a column name, an element name, an attribute name, a constructor name; and where a token sequence represents one of: a whole tuple field, a sub-field of a tuple field, a tuple or parts thereof, a whole relation, a whole database, a subset of a database, or a sub-tree of a database. The at least one memory and the computer program code may be configured to, with the at least one processor, cause the apparatus to: train a machine learning device to generate the set of vectors, wherein the machine learning device is trained on at least one of: the set of tokens sequences; and a second set of token sequences derived from an external source of entity sequences. The external source of entity sequences may be at least one of: a private database; a private corpus; a public database; and a public corpus. The query language may include at least one of: constructs which relate a strength of the relationships between a token and another token at least one of said tokens of the set of token sequences; and relation variables. The constructs may include at least one of the following constructs: the construct contains(R1.column1, e) where e is an entity variable; and the construct cos_distance (e1, e2)>c where e1, e2 are entity variables and c denotes a constant. The constructs may employ a scale to express strength of connection, wherein the strength of the connection may be measured by a function applied to at least one of: a vector from the set of vectors, and a vector obtained from performing algebraic vector operations on vectors in the set of vectors and a specified constant vector. The function may be at least one of: a cosine distance between two vectors of the same dimension; a Euclidean distance between two vectors of the same dimension; a Squared Euclidean distance between two vectors of the same dimension; a Minkowski distance and between two vectors of the same dimension; a Chebyshev distance between two vectors of the same dimension.; a variation of one of the above functions. The same dimension may be one more than one dimension. The set token sequences may include at least one of: a token sequence obtained by following foreign keys and IDREF references; and a token sequence obtained by following paths in a database tree, wherein the database is hierarchical. The at least one memory and the computer program code may be configured to, with the at least one processor, cause the apparatus to: update the set of vectors when the database is modified including vector values. The database may be at least one of: an index that for a given database entity returns database elements containing database entities having a specified strength of connection with the given entity; and a structure associating database entities to their respective vectors. The database may be one of Relational, JSON, XML, RDF and the query language may be one of SQL, Xpath, Xquery, SPARQL, HQL, Spark. The relationships may be at least one of: semantic relationships; and syntactic relationships.

In an example embodiment, a computer program product may be provided for extracting information from a database. The computer program product may comprise a computer readable storage medium, for example the memory(ies) 204 of FIG. 2, having program instructions embodied therewith. The program instructions may be executable by a device to cause the device to: generate a set of token sequences for at least a portion of a database, wherein each token in a sequence represents a respective database entity of the database; assign, for each token in the set of token sequences, at least one corresponding vector from a set of vectors of a same dimension, wherein the at least one corresponding vector encodes relationships between the database entity of a token and other database entities of other tokens of the set of token sequences; and extract, using a query language, information from the database based at least in part on the relationships encoded by the assigned vectors.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is also noted herein that while the above describes example embodiments of the invention, these descriptions should not be viewed in a limiting sense. Rather, there are several variations and modifications which may be made without departing from the scope of the present invention.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
generating a set of token sequences for at least a portion of a database, wherein each token in a sequence represents a respective database entity of the database, wherein the set of token sequences comprises at least one of:
a token sequence obtained by following at least one foreign key and at least one IDREF reference; or
a token sequence obtained by following at least one path in a database tree, wherein the database is hierarchical;
assigning, for each token in the set of token sequences, at least one corresponding vector from a set of vectors of a same dimension, wherein the at least one corresponding vector encodes relationships between the database entity of a token and other database entities of other tokens of the set of token sequences; and
extracting, using a query language, information from the database based at least in part on the relationships encoded by the assigned vectors.

2. The method of claim 1, wherein a token sequence from the set of token sequences comprises at least one token and each token represents one of: a word, a whole tuple field, a sub-field of a tuple field, a tuple or parts thereof, a relation name, a database name, a column name, an element name, an attribute name, a constructor name; and where a token sequence represents one of a whole tuple field, a sub-field of a tuple field, a tuple or parts thereof, a whole relation, a whole database, a subset of a database, or a sub-tree of a database.

3. The method of claim 1, further comprising training a machine learning device to generate the set of vectors, wherein the machine learning device is trained on at least one of:
the set of tokens sequences; or
a second set of token sequences derived from an external source of entity sequences.

4. The method of claim 3, wherein the external source of entity sequences is at least one of:
a private database;
a private corpus;
a public database; or
a public corpus.

5. The method of claim 3, wherein the machine learning device is one of a word-vector associating device, word2vec, Glove, Loglinear Generative Model, or a Neural Network.

6. The method of claim 1, wherein the query language includes at least one of:
   constructs which relate a strength of the relationships between a token and another token at least one of said tokens of the set of token sequences; or
   relation variables.

7. The method of claim 6, wherein the constructs include at least one of the following constructs:
   the construct contains(R1.column1, e) where e is an entity variable; or
   the construct cos_distance(e1, e2)>c where e1, e2 are entity variables and c denotes a constant.

8. The method of claim 6, wherein the constructs employ a scale to express strength of connection, and wherein the strength of the connection is measured by a function applied to at least one of:
   a vector from the set of vectors, or
   a vector obtained from performing algebraic vector operations on vectors in the set of vectors and a specified constant vector.

9. The method according to claim 8, wherein the function is at least one of:
   a cosine distance between two vectors of the same dimension;
   a Euclidean distance between two vectors of the same dimension;
   a Squared Euclidean distance between two vectors of the same dimension;
   a Minkowski distance and between two vectors of the same dimension;
   a Chebyshev distance between two vectors of the same dimension; or
   a variation of one of the above functions.

10. The method of claim 1, wherein the same dimension is more than one dimension.

11. The method of claim 1, further comprising updating the set of vectors when the database is modified including vector values.

12. The method of claim 1, wherein the database comprises at least one of:
    an index that for a given database entity returns database elements containing database entities having a specified strength of connection with the given entity; or
    a structure associating database entities to their respective vectors.

13. The method according to claim 1, wherein the database is one of Relational, JSON, XML, RDF and the query language is one of SQL, Xpath, Xquery, SPARQL, HQL, Spark.

14. The method of claim 1, wherein the relationships include at least one of:
    semantic relationships; or
    syntactic relationships.

15. An apparatus comprising:
    at least one processor; and
    at least one non-transitory memory including computer program code, the at least one memory and the computer program code are configured to, with the at least one processor, cause the apparatus to:
    generate a set of token sequences for at least a portion of a database, wherein each token in a sequence represents a respective database entity of the database, wherein the set of token sequences comprises at least one of:
       a token sequence obtained by following at least one foreign key and at least one IDREF reference; or
       a token sequence obtained by following at least one path in a database tree, wherein the database is hierarchical;
    assign, for each token in the set of token sequences, at least one corresponding vector from a set of vectors of a same dimension, wherein the at least one corresponding vector encodes relationships between the database entity of a token and other database entities of other tokens of the set of token sequences; and
    extract, using a query language, information from the database based at least in part on the relationships encoded by the assigned vectors.

16. The apparatus of claim 15, wherein a token sequence from the set of token sequences comprises at least one token and each token represents one of: a word, a whole tuple field, a sub-field of a tuple field, a tuple or parts thereof, a relation name, a database name, a column name, an element name, an attribute name, a constructor name; and where a token sequence represents one of: a whole tuple field, a sub-field of a tuple field, a tuple or parts thereof, a whole relation, a whole database, a subset of a database, or a sub-tree of a database.

17. The apparatus of claim 15, wherein the at least one memory and the computer program code are configured to, with the at least one processor, cause the apparatus to: train a machine learning device to generate the set of vectors, wherein the machine learning device is trained on at least one of:
    the set of tokens sequences; or
    a second set of token sequences derived from an external source of entity sequences.

18. The apparatus of claim 17, wherein the external source of entity sequences is at least one of
    a private database;
    a private corpus;
    a public database; or
    a public corpus.

19. A computer program product for extracting information from a database, the computer program product comprising a computer readable storage medium having program instructions embodied therewith, the program instructions executable by a device to cause the device to:
    generate a set of token sequences for at least a portion of a database, wherein each token in a sequence represents a respective database entity of the database, wherein the set of token sequences comprises at least one of:
       a token sequence obtained by following at least one foreign key and at least one IDREF reference; or
       a token sequence obtained by following at least one path in a database tree, wherein the database is hierarchical;
    assign, for each token in the set of token sequences, at least one corresponding vector from a set of vectors of a same dimension, wherein the at least one corresponding vector encodes relationships between the database entity of a token and other database entities of other tokens of the set of token sequences; and
    extract, using a query language, information from the database based at least in part on the relationships encoded by the assigned vectors.

* * * * *